United States Patent [19]
Woolfe et al.

[11] Patent Number: 5,796,874
[45] Date of Patent: Aug. 18, 1998

[54] RESTORATION OF FADED IMAGES

[75] Inventors: Geoffrey John Woolfe, Penfield; Bruce Harold Pillman; Michael James Barry, both of Rochester, all of N.Y.

[73] Assignee: Eastman Kodak Company, Rochester, N.Y.

[21] Appl. No.: 643,155

[22] Filed: Apr. 30, 1996

[51] Int. Cl.⁶ .................................................. G06K 9/40
[52] U.S. Cl. .................. 382/254; 382/162; 358/518; 358/531; 358/509; 396/655; 430/357; 430/359
[58] Field of Search .................................. 382/162, 254; 358/518, 522, 509, 531, 527; 396/655; 430/359, 43, 357, 545; 428/195

[56] References Cited

U.S. PATENT DOCUMENTS

| | | | |
|---|---|---|---|
| 4,486,772 | 12/1984 | Klie et al. | 358/531 |
| 4,516,155 | 5/1985 | Hennig et al. | 358/531 |
| 4,717,646 | 1/1988 | Giorgi | 430/359 |
| 4,979,032 | 12/1990 | Alessi et al. | 358/76 |
| 5,208,903 | 5/1993 | Curry | 345/431 |
| 5,267,030 | 11/1993 | Giorgianni et al. | 358/527 |
| 5,420,979 | 5/1995 | Madden et al. | 395/162 |
| 5,543,940 | 8/1996 | Sherman | 358/518 |

OTHER PUBLICATIONS

"Optimum Reproduction of Colour Photographs by Digital Image Processing". The Journal of Photographic Science, vol. 38, 1990; pp. 98–100.

"Mathematical Bleaching Models for Photographic Three–Color Materials*", Journal of Imaging Science and Technology, vol. 38, No. 6, Nov./Dec. 1994; pp. 513–519.

"Electronic Imaging, a Tool for the Reconstruction of Faded Color Photographs", Journal of Imaging Science and Technology, vol. 38, No. 6, Nov./Dec. 1994; pp. 520–525.

"Restoration of Faded Colour Photographs by Digital Image Processing". The Journal of Photographic Science, vol. 38, 1990; pp. 193–196.

"Investigations on the Bleaching Behavior and the Reconstruction of Faded Colour Prints" The Journal of Photographic Science, vol. 41, 1993; pp. 76–77.

"Investigation and Quantification of Inter–Image Effects" The Journal of Photographic Science, vol. 41, 1993; pp. 86–87.

"Restoring Faded Color Transparencies by Duplication (Tri-color Printing Method)" Current Information Summary (Eastman) Kodak Compnay), CIS–23; Aug., 1981, (9 pages).

"Restoring Faded Transparencies by Duplication (White–Light Printing Methods)" Current Information Summary (Eastman Kodak Company), CIS–22, Jan. 1988, (7 pages).

"Copying Old Photos" Kodak Information Center (Eastman Kodak Company), Phamphlet AM–100, Jun. 1989, (4 pages).

*Primary Examiner*—Joseph Mancuso
*Assistant Examiner*—Anh Hong Do
*Attorney, Agent, or Firm*—Gordon M. Stewart

[57] ABSTRACT

A method of restoring a color image comprised of one or more colorants and which image may have faded over time, which image is represented by an image signal. The method uses both a restoration model and provides a means which enable a user to readily interact with the restoration process to obtain a final restoration. In a second aspect, the restoration model is used in conjunction with a lightness distribution mapping to provide a high quality restoration. The restoration model is a function of a variable time, and is the inverse of a model representing the fade rate of at least one of the colorants as a function of at least a variable time (and preferably also as a function of the other colorants). An apparatus for performing the method is provided. A computer readable medium has computer readable code means which can execute the method in a suitable computer.

25 Claims, 9 Drawing Sheets

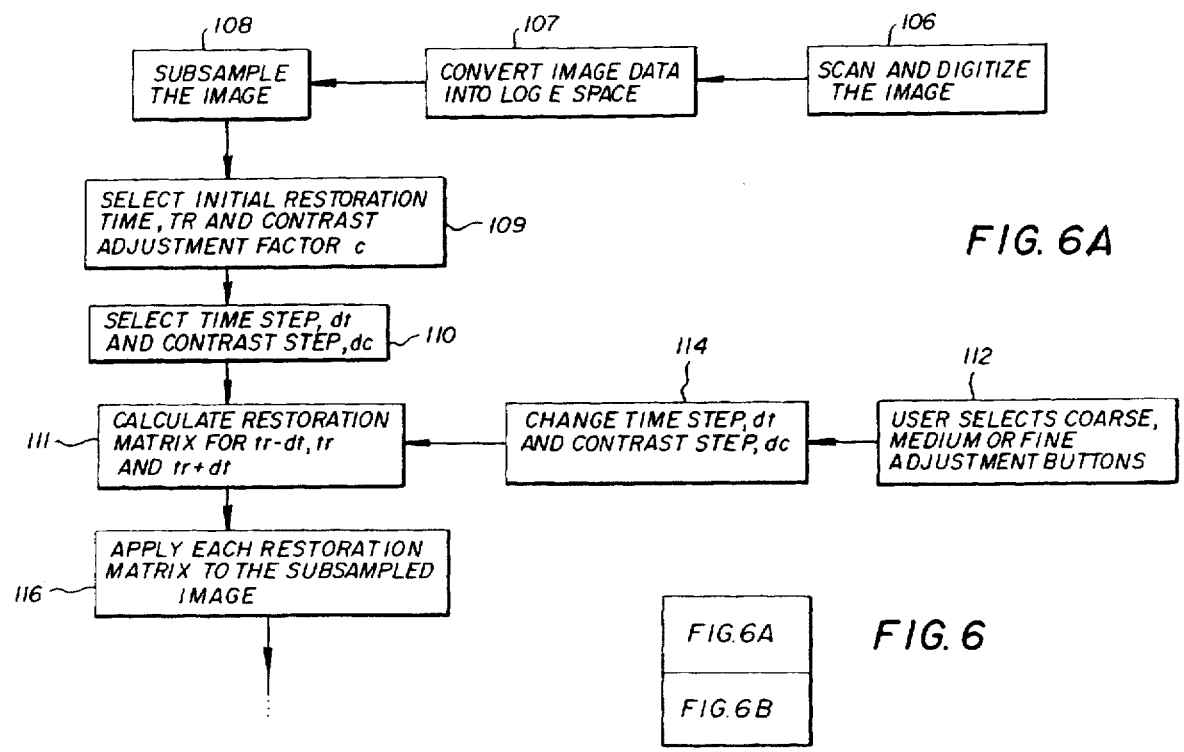

RESTORATION OF FADED IMAGES

FIELD OF THE INVENTION

The invention relates generally to the field of imaging, and in particular to restoring hardcopy images composed of one or more colorants, which images may have faded over time.

BACKGROUND OF THE INVENTION

In the photographic or printing arts, color images are recorded in the form of one or more colorants on a base (such as paper or transparent plastic). For example, in the photographic arts the colorants in a developed image are typically cyan, magenta and yellow dyes arranged in layers on a support. In printing arts an additional black colorant is often used. A difficulty with such hardcopy images is that they tend to fade over time at rates which depend upon the chemical compounds of the colorants themselves and their environment. That is, they decompose or react to form other compounds which have absorption spectra different from the original colorants. For example, typical cyan, magenta and yellow dyes will decompose into mostly colorless compounds particularly under room light and more so under sunlight.

Fading of an original hardcopy is clearly undesirable. Not only does the image become fainter, but since different ones of the component colorants will fade at different rates, undesirable color shifts occur. For example, an original image may take on an overall green tint in addition to becoming fainter. It is possible to attempt to enhance a faded hardcopy image by scanning it to obtain a digital image signal. The image is then displayed on a computer and a user can use known image processing software to increase color saturation and alter color balance on a trial and error basis until a visually pleasing image is obtained. Such a procedure is highly time consuming particularly when a large number of hardcopy images need to be processed. Also, as is the case with "enhancement" techniques, while the image is made more visually pleasing, such a method does not attempt to actually restore the faded image to how it actually appeared (that is, the resulting enhanced image may look little like the unfaded image).

One method which attempts to provide a better rendition of color in images copied by digital copiers or the like, is histogram stretching. This is described, for example, by Gschwind et al. in *The Journal of Photographic Science* V. 38 (1990), Proceedings Issue, p. 99. This procedure simply assumes that any given image should have both black and white points and stretches the histogram for each color channel of an image to ensure that it does. For each color channel, all locations of the image having a given lightness value of a color channel have their values moved the same amount regardless of their environment in the image (that is, regardless of what other colorants may have been present at the same location in the original image). This technique does not attempt to restore faded images.

Methods which can restore, at least in part, a faded color image, have been previously described by Gschwind et al. in *Journal of Imaging Science and Technology* V. 38, No. 6 (Nov./Dec. 1994) p. 513; *Journal of Imaging Science and Technology* V. 38, No. 6 (Nov./Dec 1994) p. 520; *Journal of Photographic Science* V. 38 (1990) p. 193; *Journal of Photographic Science* V. 41 (1993) p. 76; and *Journal of Imaging Science and Technology* V. 38, No. 6 (Nov./Dec. 1994) p. 513. In the foregoing articles a method is described wherein a linear bleach model of the dye is generated. The described methods require that numerical coefficients of the matrix bleaching equation be developed for each time of interest, from accelerated fading tests of the colorants. For rapid and simple processing of faded images, this would require a considerable amount of time and operator skill and familiarity with the software to process each faded image of interest. A considerable amount of subjective judgment is also required to obtain a final acceptable image. Further, such methods require the use of narrow band interference filters (which are not used on typical scanners) to minimize incorrectly interpreting a side band absorption of one colorant (which overlaps the main absorption of another colorant) as absorption of the other colorant. This is discussed in further detail by Gschwind et al. in *Journal of Imaging Science and Technology* V. 38 No. 6 (Nov./Dec. 1994) p. 520 at p. 522–524.

It would be desirable then to provide a method and apparatus which can provide good restoration of a faded image with no, or a relatively low level of, operator skill and intervention required. It would also be desirable that where operator intervention is required, that it can be readily provided by even completely inexperienced users. It would further be desirable that conventional scanners, which use wide band filters, could be used without the need to add special narrow band filters to them.

SUMMARY OF THE INVENTION

The present invention realizes that a more automated reconstruction of a faded image can be obtained by generating a fading equation with coefficients which are a function of time, and using the inverse of such equation (which still has coefficients as a function of time). To restore a faded image a user can then simply enter the time of fading and obtain one or more preliminary restorations. Furthermore, the present invention realizes that histogram stretching is in itself inherently very poor in attempting to restore a faded image and in fact, can cause further color distortions. This is so because histogram stretching alone changes the lightness of all locations in an image of a given color channel lightness value an equal amount, regardless of what other colorants may have been present in the original faded image at the same location. The present invention realizes though that a lightness distribution mapping following application of an inverse fading equation, can produce an enhanced restoration of a faded image in the form of what is referenced herein as a potential restoration. The present invention further realizes that a typical user who wishes to restore a faded image such as a photograph, may not know the actual time over which the image has faded. Therefore, the present invention further provides a very simple and convenient user interface which generates and displays a limited number of preliminary or potential restorations, but then allows the user to rapidly move through a much larger number for selected fade times based only on visual cues.

The present invention then, provides in one aspect a method of restoring a color image. The color image is one which is comprised of one or more colorants, and which image may have faded over time. The image is represented by an image signal (such as may be obtained, for example, by scanning the original image). The method comprises:

obtaining a restoration model which is a function of a variable time, which is the inverse of a model representing the fade rate of at least one of the colorants as a function of at least a variable time;

selecting a time over which the image may have faded;

applying the restoration model to the image signal to obtain a first preliminary restoration;

selecting at least one further time over which the image may have faded;

applying the restoration model to the image signal for each of the further times to obtain one or more further preliminary restorations;

displaying the preliminary restorations; and upon a user selecting one of the displayed restorations which corresponds to a currently selected time, $t_c$, in a first direction from another time, $t_j$, to which another of the displayed restorations corresponds, then applying the restoration model to the image signal using an additional time, $t_a$, to obtain an additional preliminary restoration, and displaying the additional preliminary restoration, wherein:

$$t_a > t_c \text{ if } t_c > t_j,$$

or $$t_a < t_c \text{ if } t_c < t_j.$$

In a second aspect of the present invention a lightness distribution mapping is applied subsequent to application of the restoration model, to obtain what is referenced as a potential restoration. This aspect of the method comprises:

obtaining a restoration model which is a function of a variable time, which is the inverse of a model representing the fade rate of at least one of the colorants as a function of at least a variable time;

selecting a time over which the image may have faded;

applying the restoration model to the image signal to obtain a first preliminary restoration; and then determining characteristics of a lightness distribution of at least one color channel for the first preliminary restoration, and when the characteristics do not meet preselected characteristics then modifying the first preliminary restoration so that the resulting first potential restoration meets the preselected characteristics.

The method may particularly be applied to an image signal which is a representation of the image in a source independent space (such as logE space).

A means for performing the method of the present invention are also provided. These means can be hardware or software implemented.

The present invention can provide good restoration of a faded image with no, or a relatively low level of, operator skill and intervention required. Where operator intervention is required, the present invention provides a user interface which can be readily followed by even completely inexperienced users based on displayed restorations. The present invention, particularly where the image signal represents the image in a source independent space does not require the use of multiple restoration models which otherwise might be required when the images to be restored were obtained from various image sources (such as from different photographic paper types or other different media, or different input scanners). These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

To facilitate understanding, identical reference numerals have been used, where possible, to designate identical elements that are common to the figures.

EMBODIMENTS OF THE INVENTION

Figure 1A:
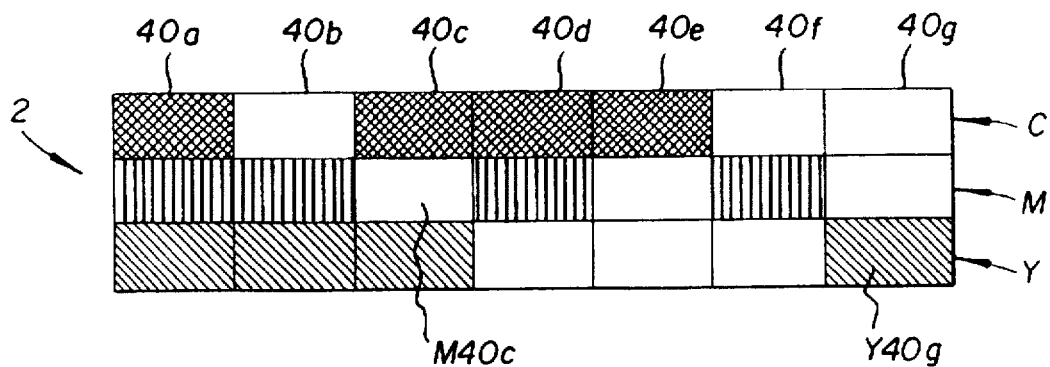
FIG. 1A is a vertical cross-section through an element carrying different dye layers which represent a two-dimensional image, which image is an original image recorded by the element and has not faded.

Referring first to FIG. 1A, there is diagramatically shown a vertical cross-section through a typical image carrying element 2. Element 2 may, for example, represent a processed color photographic film. For illustrative purposes different locations in the two-dimensional image are shown as vertical columns 40a through 40g. Element 2 has three layers, namely a cyan colorant carrying layer C, magenta colorant carrying layer M, and yellow colorant carrying layer Y. For convenience, specific locations within the three dimensional element will be referenced by the colorant layer type followed by a column location (a column location alone being a location in the two-dimensional image). For example, the location of the yellow layer at column 40g will be referenced as Y40g. The location of the cyan layer in column 40g would be C40g. Lighter or fewer lines for a given colorant indicate less of that colorant while no shading at all indicates no colorant at that location. For example, there is no cyan colorant at locations C40b, C40f and C40g. Whether any one of those colorants is present at a particular location and their amounts will depend on the image being carried by element 2. For example, some locations of the image, such as column 40g, will carry only yellow colorant (and hence appear yellow in color to a viewer), while other locations, such as column 40a, will carry all three colorants (and hence will appear black to a viewer). In typical transparent photographic elements, cyan layer C would rest on a transparent base while in typical reflective photographic elements, yellow layer 30 would rest on a reflective base (such as paper). For the purposes of the discussion below, it will be assumed that the yellow layer Y rests on a reflective base (not shown) such that element 2 is normally viewed by reflected light coming from the direction above cyan layer C.

However, it will be understood that no particular configuration is essential for the present invention.

Figure 1B:
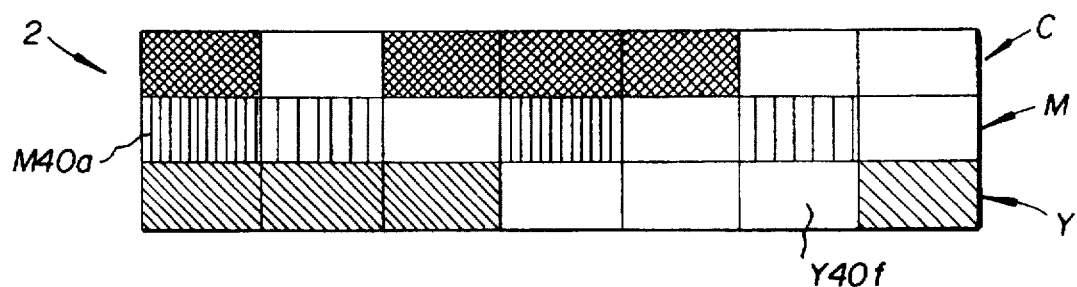
FIG. 1B is the same view as FIG. 1A but after the image has faded.

Referring now to FIG. 1B, the results of fading of the image which may occur particularly after prolonged exposure of the image to light, can be seen. The light which causes fading (mostly, but not only, ultraviolet light) will be absorbed by each dye in turn, as well as the carrier material of each layer (for example, the gelatin gel in a photographic film). This means that the same colorant will tend to experience less fading if it has other dyes above it, and further that as between two dyes which have no other colorants above them those lower in the film (that is toward yellow layer Y) will tend to experience less fading. Thus, yellow dye at Y40a will tend to experience less fading than yellow dye at Y40b or Y40c, which in turn will both have less fading than yellow dye at Y40g. Similarly, magenta dye at M40a and M40d will tend to fade less than magenta dye at M40b and M40f. Thus, the fading of a particular image colorant in a multilayer element, such as photographic film or paper, is not simply a function of the particular colorant in question, the light intensity and time, but is also a function of the amount of other dyes above it at each location in the two-dimensional image.

Because of the dependence on fading of a given colorant on the amounts of other colorants present at the same image location in a multilayer element, a histogram stretch of each color channel necessarily fails when used to attempt to restore a faded image. This can be seen from FIGS. 2A and 2C. For the purposes of discussion, these figures show a histogram of a yellow channel. Such histograms can be obtained in a well known manner. For example, the image in element 2 may be scanned to produce a digital image of x by y pixels with each color channel having a range of color values (typically 255 values in each of three color channels in a 24-bit color system). Then, for the color channel in question the frequency of occurrence of each digital value is plotted against that value. Basically, a simple histogram stretch fails because it treats all given color channel values equally, without regard to the location in the image from which each pixel having that value came (that is, it fails to account for the presence, absence, or amount of other colorants above the one of interest).

Figure 2A:
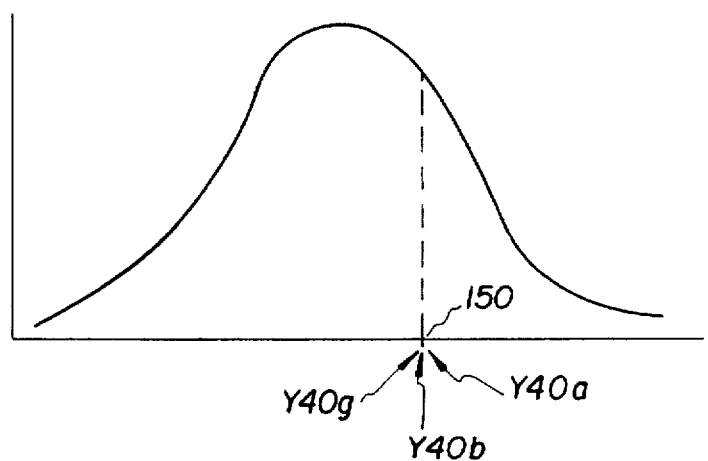
FIGS. 2A–2D illustrate why a histogram stretch alone cannot restore a faded image while an inverse fading algorithm followed by a lightness distribution mapping can.
Figure 2B:
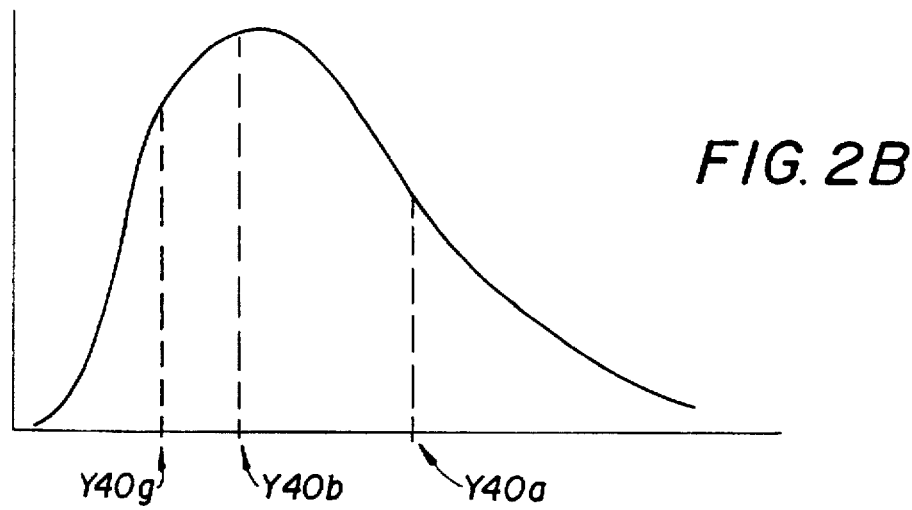
Figure 2C:
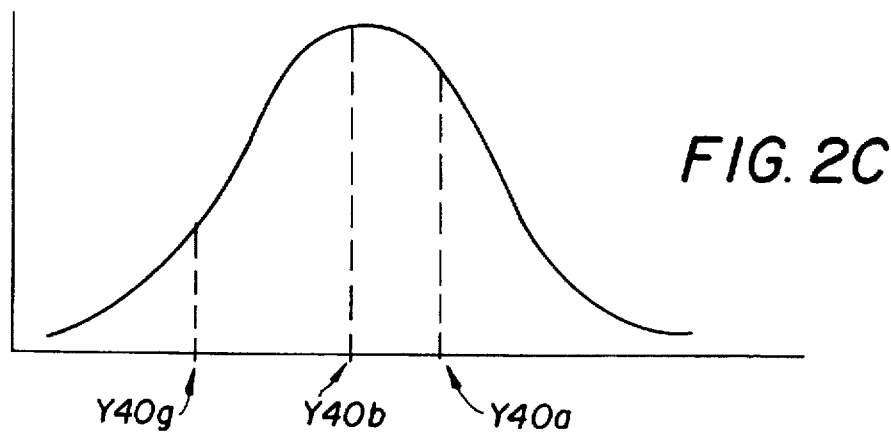
Figure 2D:
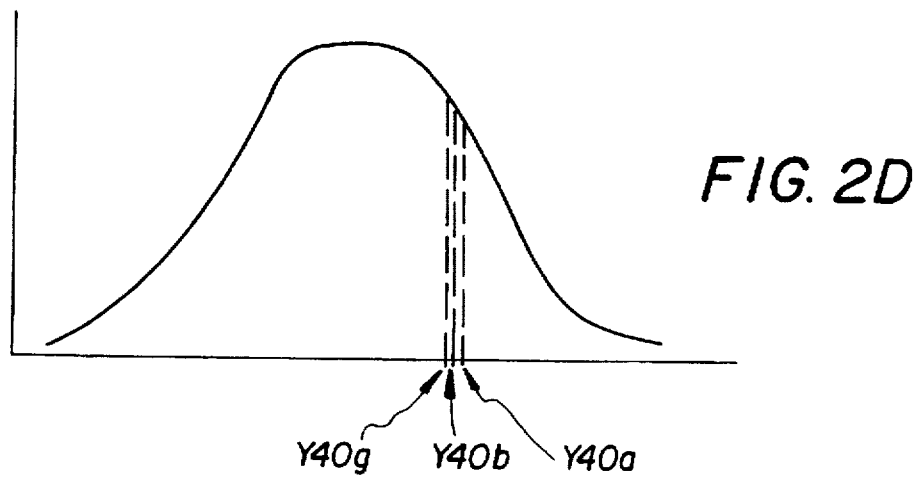

For example, in FIG. 2A the histogram shows the yellow color channel for an image with higher values representing higher color saturation. Value 150 has been arbitrarily assigned to represent a yellow lightness value of locations Y40a Y40b and Y40g in element 2. Following prolonged exposure to light all yellow values will fade to some extent such that the histogram is shifted to the left (that is, toward lighter colors). However, as explained above, region Y40g will fade more Y40b, which in turn will fade more than Y40a. Thus, the foregoing regions will have their respective lightness values after fading as shown in FIG. 2B. Note that they are no longer the same lightness values. A simple histogram stretch of the faded image represented by FIG. 2B merely attempts to shift the overall curve shape back to a more symmetric distribution such as shown in FIG. 2C. However, such a simple histogram stretch fails to account for the fact that the values for Y40g, Y40b and Y40a in FIG. 2B need to be mapped according to different functions which take account of the other dyes present at their respective locations.

The present invention uses a model to account for the presence of other colorants at the same location while realizing that the model alone will not yield a relatively good restoration. Numerous models could be chosen, with exponential models being most likely based on the photochemical processes involved in fading. However, the preferred model is a linear fading model as the model needs to be descriptive of the actual changes in dye density observed in controlled fading experiments and in most cases the fading data is too noisy to take advantage of more sophisticated models.

The preferred linear fading model has the form:

$$C(t) = f_{1,1}(t)C_0 + f_{1,2}(t)M_0 + f_{1,3}(t)Y_0$$

$$M(t) = f_{2,1}(t)C_0 + f_{2,2}(t)M_0 + f_{2,3}(t)Y_0 \quad [1]$$

$$Y(t) = f_{3,1}(t)C_0 + f_{3,2}(t)M_0 + f_{3,3}(t)Y_0$$

where: C(t), M(t) and Y(t) are the analytical densities of the cyan, magenta and yellow colorants of the image after fading; $C_0$, $M_0$ and $Y_0$ are the initial analytical densities of the three colorants before any fading occurred; and $f_{x,y}(t)$ are coefficients which are functions of t. The extent of fading is parameterized in the variable t which can be likened to an exposure variable, being the product of the average intensity of fading light and the time which the image has been exposed to the fading light. The units of t in this implementation are room-years. This is the number of years that the image has been exposed to fading light equal in intensity to an average room. Note that each of the coefficients $f_{x,y}$ is a function of a variable time and therefore the model as a whole is a function of a variable time.

Equation [1] can be expressed in matrix notation as:

$$\begin{bmatrix} C(t) \\ M(t) \\ Y(t) \end{bmatrix} = \begin{bmatrix} f_{1,1}(t) & f_{1,2}(t) & f_{1,3}(t) \\ f_{2,1}(t) & f_{2,2}(t) & f_{2,3}(t) \\ f_{3,1}(t) & f_{3,2}(t) & f_{3,3}(t) \end{bmatrix} \begin{bmatrix} C_0 \\ M_0 \\ Y_0 \end{bmatrix} \quad [2]$$

In the preferred embodiment, because of limitations in the fading data, the matrix coefficients were implemented as simple linear functions. Therefore the fading model becomes $$\begin{bmatrix} C(t) \\ M(t) \\ Y(t) \end{bmatrix} = \begin{bmatrix} 1-a_{1,1}(t) & a_{1,2}(t) & a_{1,3}(t) \\ a_{2,1}(t) & 1-a_{2,2}(t) & a_{2,3}(t) \\ a_{3,1}(t) & a_{3,2}(t) & 1-a_{3,3}(t) \end{bmatrix} \begin{bmatrix} C_0 \\ M_0 \\ Y_0 \end{bmatrix} \quad [3]$$

where the $a_{i,j}$ are constants that are derived from an analysis of the fading data.

To obtain the values for $a_{x,y}(t)$ it is necessary to artificially fade colored patches of various known initial lightness values in each of the three color channels. The patches should include appropriate colorant mixtures in addition to the colorants alone. The change in lightness value of each of the color channels is recorded as a function of the total exposure to fading light which corresponds to the product of the intensity of the fading light and exposure time. The relationship between exposure to fading light and the change in lightness value in each of the color channels is then modeled using a suitable function, in this case the linear model described above.

Following the foregoing procedure, the fading matrix was developed from data based on a kinetic analysis of KODAK EKTACOLOR PLUS daylight fading characteristics. This led to the following model:

$$\begin{bmatrix} C(t) \\ M(t) \\ Y(t) \end{bmatrix} = \begin{bmatrix} 1-0.002625t & 0.001421t & 0.001807t \\ 0.005784t & 1-0.011283t & 0.005054t \\ 0.003040t & 0.004265t & 1-0.010913t \end{bmatrix} \begin{bmatrix} C_0 \\ M_0 \\ Y_0 \end{bmatrix} \quad [4]$$

The original analytical densities of the three colorants in the image can now be calculated from the inverse of the matrix in Equation (4), namely:

$$\begin{bmatrix} C_0 \\ M_0 \\ Y_0 \end{bmatrix} = \begin{bmatrix} 1-0.002625t & 0.001421t & 0.001807t \\ 0.005784t & 1-0.011283t & 0.005054t \\ 0.003040t & 0.004265t & 1-0.010913t \end{bmatrix}^{-1} \begin{bmatrix} C(t) \\ M(t) \\ Y(t) \end{bmatrix} \quad [5]$$

Note that the restoration model of equation (5) is still a function of t (room-years). Thus, once Equation (5) has been obtained, then for any faded image it is only necessary to obtain t under daylight conditions to calculate the original dye densities $C_0$, $M_0$ and $Y_0$. It is not necessary to re-evaluate different co-efficients for different values of t.

It is apparent from the equation above that singularities in the restoration matrix exist at points where the fade matrix becomes singular. These points can be found from the roots of the cubic equation for the determinant. The roots in this case are approximately 63.6, 114.4 and 2831.7 room years. As the restoration time, t, approaches any of these roots, numerical precision limitations in the computer result in fluctuating and inaccurate restoration matrices being generated, with gain factors ($a_{11}$, $a_{22}$, $a_{33}$) that are excessively large. This leads to a poor restoration. In order to prevent this problem the t parameter is transformed by means of the following equation:

$$t_c = 60(1-e^{-t/60}) \quad [5A]$$

Equation (5A) introduces a soft clip into the t parameter, causing it to asymptotically approach 60, but never reach it.

The restoration equation in the preferred embodiment then becomes:

$$\begin{bmatrix} C_0 \\ M_0 \\ Y_0 \end{bmatrix} = \frac{1}{Det} \begin{bmatrix} b_{1,1} & b_{1,2} & b_{1,3} \\ b_{1,2} & b_{2,2} & b_{2,3} \\ b_{1,3} & b_{2,3} & b_{3,3} \end{bmatrix} \begin{bmatrix} C(t) \\ M(t) \\ Y(t) \end{bmatrix} \quad [6]$$

where
Det=$1-0.024821\ t_c+1.46128H10^{-4}\ t_c^2-4.85529H10^{-8}\ t_c^3$
$b_{1,1}=1-0.022196\ t_c+1.01576H10^{-4}\ t_c^2$
$b_{1,2}=-0.001421\ t_c+2.32142H10^{-5}\ t_c^2$
$b_{1,3}=-0.001807\ t_c+2.75701H10^{-5}\ t_c^2$
$b_{2,1}=-0.005784\ t_c+7.84850\ H10^{-5}\ t_c^2$
$b_{2,2}=1-0.013538\ t_c+2.31533\ H10^{-5}\ t_c^2$
$b_{2,3}=-0.005054\ t_c+2.37184\ H10^{-5}\ t_c^2$
$b_{3,1}=-0.003040\ t_c+5.89691\ H10^{-5}\ t_c^2$
$b_{3,2}=-0.004265\ t_c+1.55155\ H10^{-5}\ t_c^2$
$b_{3,3}=1-0.013908\ t_c+2.13988\ H10^{-5}\ t_c^2$ Although these were obtained using data for EKTACOLOR PLUS, it has been found in practice that they can be applied with good success when used with the lightness distribution mapping and log exposure metric (as described below), to many different photographic prints.

However, the present invention appreciates there are several factors which inherently limit the accuracy of the inverse fade restoration procedure. These include:

1. The limited accuracy of the original fade data from which the model was constructed.
2. The fact that the model parameters pertain to a particular photographic paper, fading under certain controlled conditions. In practical situations a range of different origination materials and fade conditions will be encountered. Thus, while the model can still produce good results even with various faded images, it's accuracy will vary.
3. The restoration model should be applied in an analytical density metric but a number of system advantages can be obtained by processing images by using a signal representation of the image in a source independent space, for example a log exposure metric. It is therefore preferred to apply the restoration matrix to the image signal representation in the preferred log exposure signals.

The foregoing errors may appear as either:
1. incorrect contrast;
2. Incorrect density; or
3. slight overall color balance error.

The present invention realizes that a lightness distribution mapping following, but not preceding, application of the inverse fade model to the matrix can further improve the restoration of a faded image.

Figure 2F:
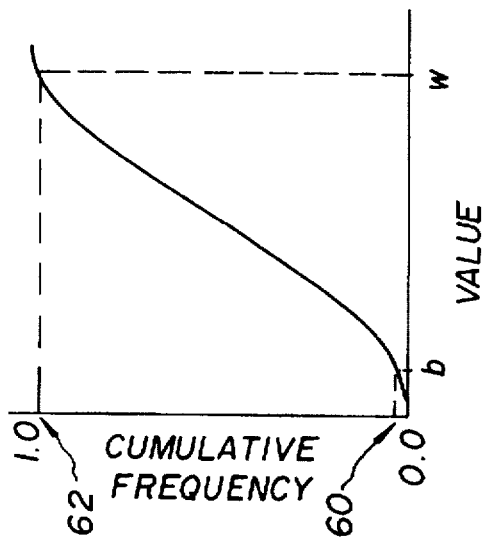
FIGS. 2E to 2H illustrate one way to obtain preselected white and black point values for mapping lightness values in a preliminary restoration.
Figure 2H:
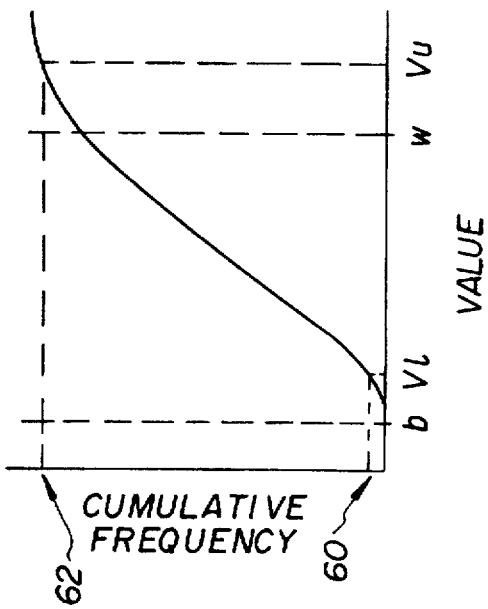
Figure 2E:
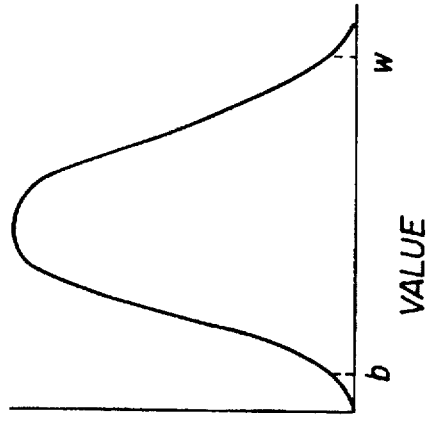

In particular, the preferred method used for histogram mapping on a digitized original image to which the restoration model has been applied to generate a preliminary restoration, is as follows:

1. Compute the lightness histograms of each of the red, green and blue color channels after application of the restoration model.
2. Compute the cumulative histograms for the each of the red, blue and green color channels.
3. Next, the histogram of the preliminary restoration is to be mapped so that the percentage of the image having values above a preselected white point and below a preselected black point, will be typical of that for an ideal image. This is done as follows:

One obtains white and black values, w and b, respectively from a cumulative histogram (FIG. 2F) of an ideal image (a histogram for which is shown in FIG. 2E). This can be done by preselecting proportions of the image that have values lying above a visual "white" and below a visual "black", and obtaining the corresponding white and black values, w and b, from FIG. 2F. Alternatively, one can adjust the white and black values empirically based upon a subjective judgement of a number of actual images. Once determined the white and black values, w and b, respectively, are assigned as constants for any image.

Figure 2G:
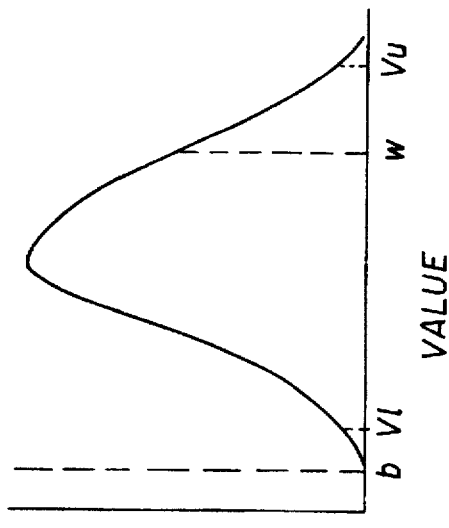

Then, the values of Vu and Vl are calculated for each channel which correspond to the same percentiles 62 and 60. These are shown diagramatically on the cumulative histogram of FIG. 2H (where FIG. 2G is an actual histogram of a preliminary restoration). A lightness mapping of the lightness values in each color channel is then performed for each color channel as follows:

where:

$V_u$—The upper percentile point on the histogram
$V_l$—The lower percentile point on the histogram
b—The black reference value
w—The white reference value
g—The mid-grey reference value Then calculate a mid-gray, $V_m$ for the input histogram:

$$V_m = V_l + \frac{(g-b)(V_u - V_l)}{w-b}$$

Calculate the auto shift, S:

$$S = g - V_m$$

Calculate the auto gain, $G_a$:

$$G_a = \frac{w - b}{V_u - V_l}$$

If an additional, manual gain (contrast) adjustment $G_m$ is also in effect, then calculate the effective total gain $G_{\it{eff}}$ from the equation below. If there is no manual gain (contrast) adjustment in place then use $G_m=1$:

$$G_{\it{eff}}=1+G_m(G_a-1)$$

Finally, modify the image:

$$V_{out}=G_{\it{eff}}(V_{in}-V_m)+V_m+S$$

All pixels above the upper percentile limit will be mapped to whites whiter than the reference white and all pixels below the lower percentile will be mapped to blacks below (blacker than) the reference black, and pixels in between will be mapped linearly according to the above equations. In our preferred embodiment the percentiles chosen lie in the ranges:

0% to 5% for the lower percentile corresponding to black point (0% is preferred for this implementation);

95%–100% for the upper percentile, corresponding to the white point (100% is preferred for this implementation).

Note that if the percentile values are altered of course, the white and black values would also be altered accordingly. Further, a function other than a linear function could be used for the mapping, but the above linear function is preferred. However, any function chosen should preferably be monotonically increasing. That is, as the input lightness value increases, the output lightness value must also increase (note that this does not necessarily mean that the output value has to be greater than the input value).

The preferred mapping point for the reference black is at a code value of between 40 and 70 (50 is preferred) (using 8 bits per color channel of dynamic range) in log exposure space. The preferred mapping point for the reference white is at a code value of between 200 and 255 (230 Is preferred) (using 8 bits per color channel of dynamic range) in log exposure space.

Figure 3A:
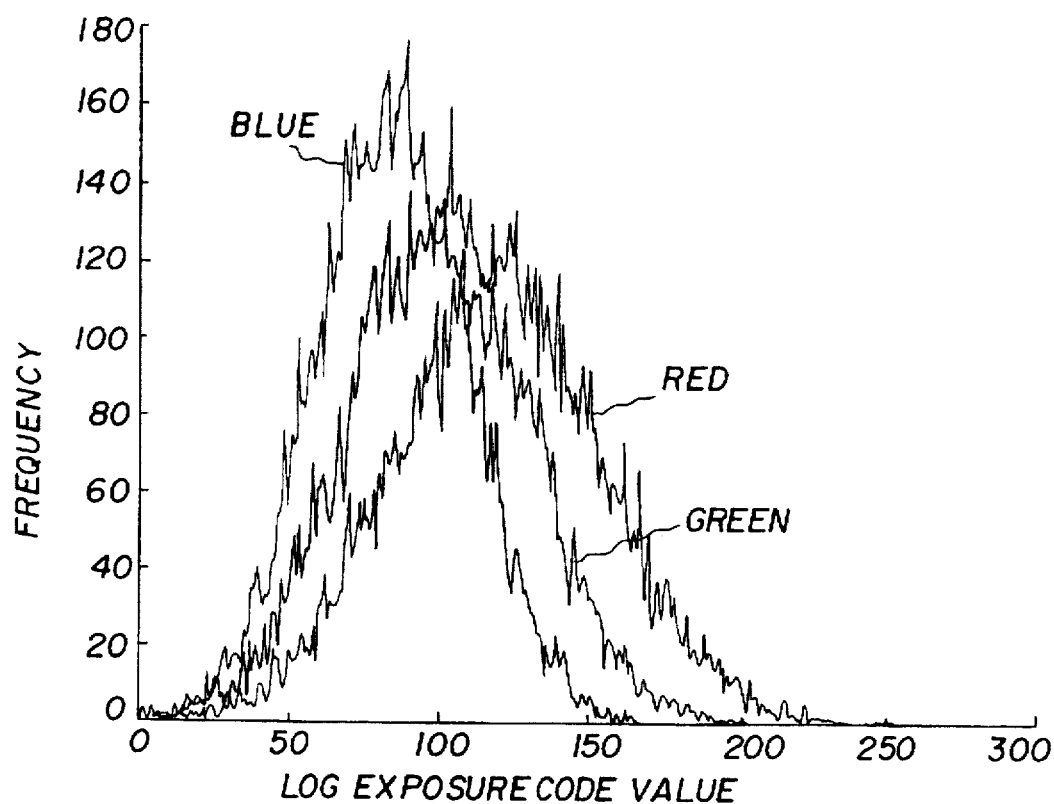
FIG. 3A illustrates a lightness histogram of a faded color negative image.
Figure 3B:
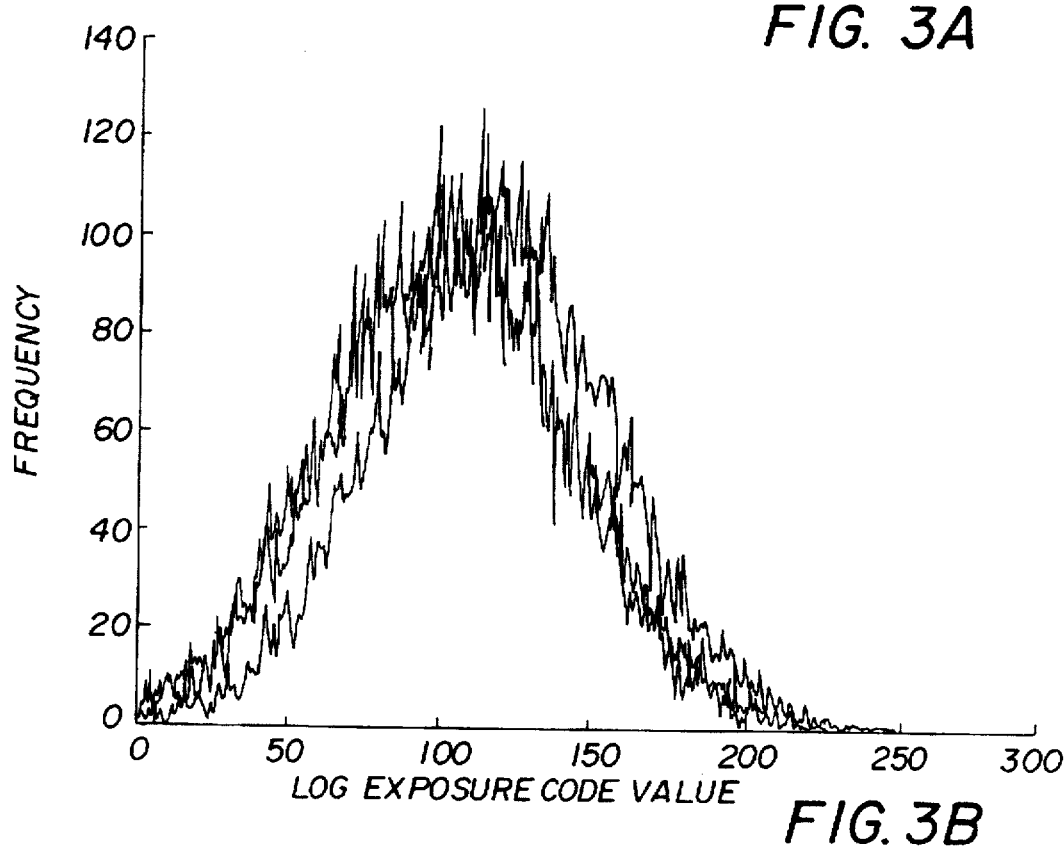
FIG. 3B illustrates a lightness histogram of the image represented by FIG. 3B after application of the restoration model of the present invention.
Figure 4A:
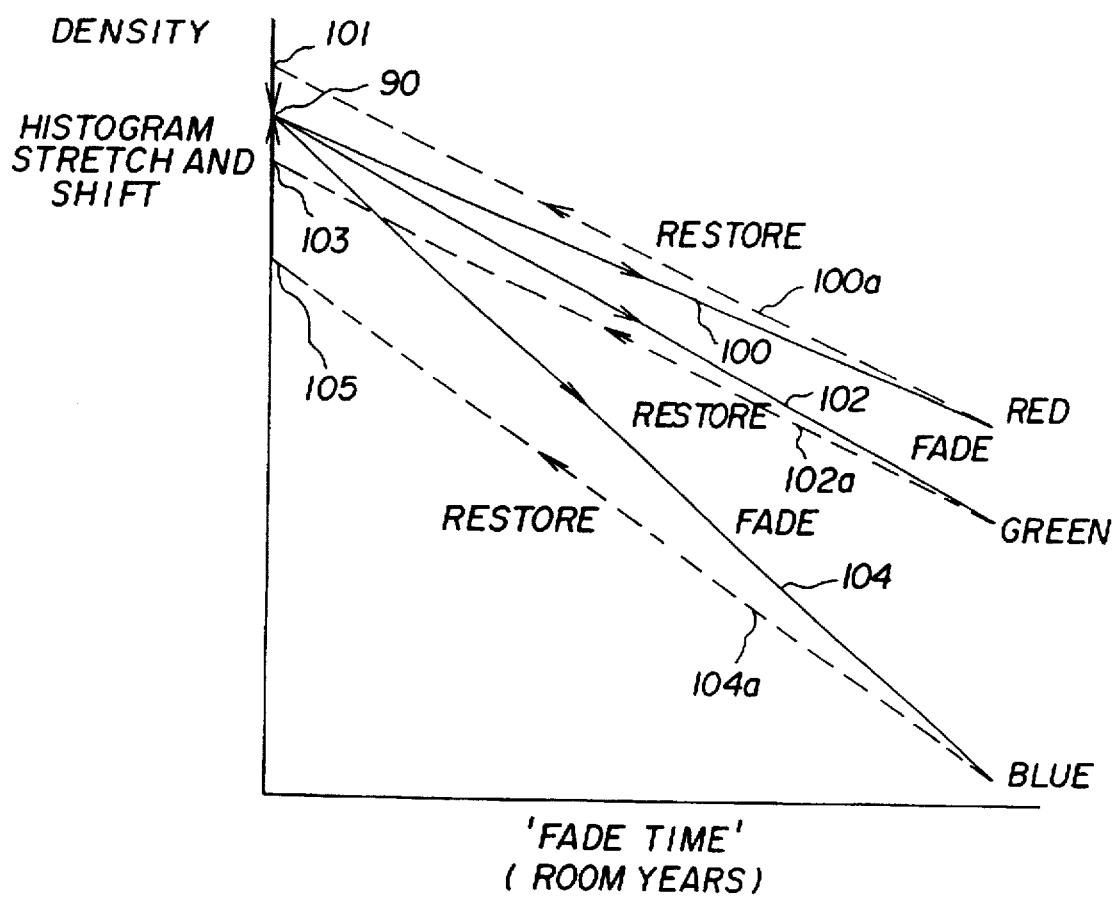
FIG. 4A illustrates in further detail why an inverse fading alone does not produce a good restoration, but when followed by a lightness distribution mapping the restoration is improved.
Figure 4B:
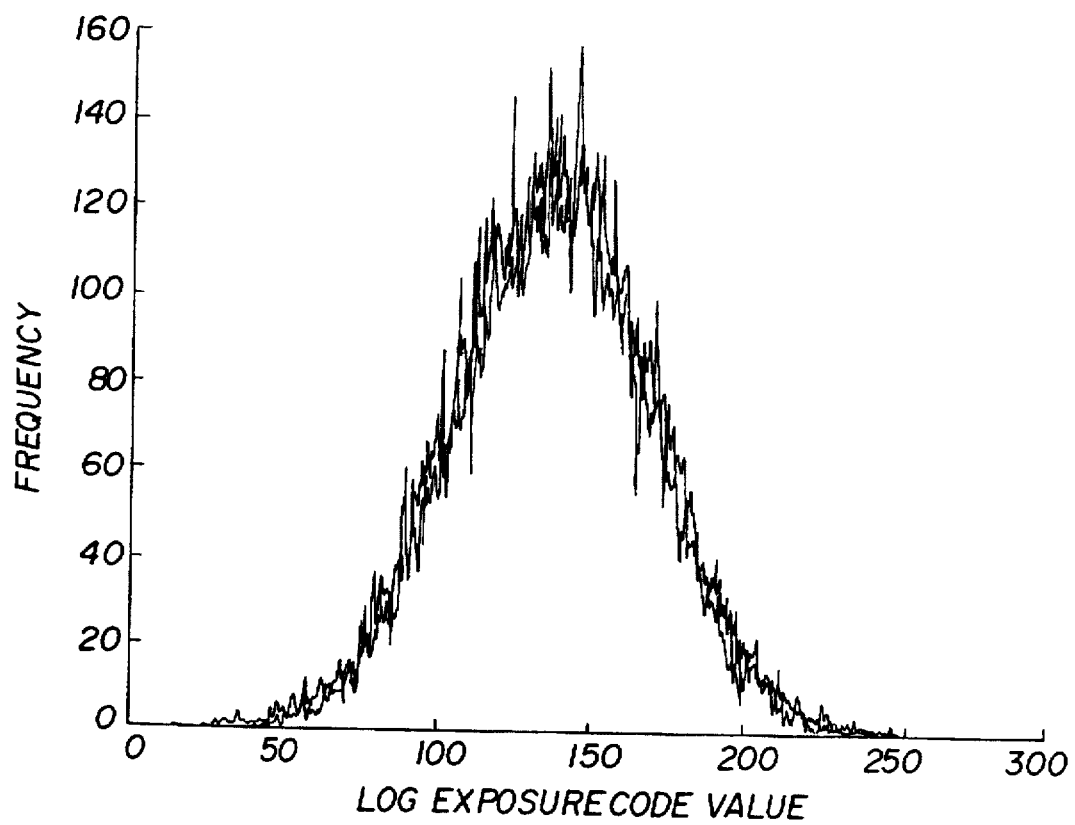
FIGS. 4B shows the histogram for the image represented by FIG. 3B after is has been further processed with lightness distribution mapping of the present invention.

The fact that application of the restoration model alone does not provide an ideal restoration, but when combined with a subsequent histogram mapping can yield an improved restoration, is illustrated in FIGS. 3A, 3B, 4A and 4B. FIG. 3A illustrates RED, GREEN and BLUE color channel histograms from a typical faded color negative image but similar considerations apply to color positive images also. Note that in the unfaded image all of the histograms would appear to more closely coincide and be centered about mid-way between the darkest value of 0 and the lightest value of 255. Applying the restoration model described above results in a preliminary image histogram such as shown in FIG. 3B. Note again that, unlike a simple histogram stretching, that application of the restoration model, for each color dye, accounts at every pixel for the presence and amounts of the other two dyes, as described above.

However, the preliminary restoration is not ideal, as can be seen from FIG. 3B, for the reasons discussed above. More particularly, referring to FIG. 4A, there is illustrated the fading over time of a neutral section of an image. Before any fading (that is, at 0 Room-Years) the RED, GREEN and BLUE Density values will all be the same at position 90. Note that the section fades over time along respective lines 100, 102 and 104 to become both non-neutral and much lower in overall density. Due to the limitations of the restoration matrix discussed above, the application of the restoration matrix effectively moves the RED, GREEN and BLUE density values back along the broken lines 100a, 102a, and 104a to their intersections 101, 103, and 105 with the "Density" axis at 0 Room-Years fade time, rather than the ideal of moving them back along the solid lines 100, 102 and 104. Thus, while the image is partially restored an ideal restoration is not obtained from the restoration model alone.

The lightness distribution mapping then achieves the following:

1. It forces the very light and very dark portions of the image to be neutral.
2. It compensates for errors in restoration introduced by the limitations of the restoration model.
3. It compensates for the compression and errors introduced by applying the restoration model in a log exposure space rather than an analytical density space.

By subsequently applying the lightness distribution mapping as described above, white and grey points in the image are forced to neutral. This can be seen by reference to FIGS. 3B and 4B. Because each color channel lightness distribution is mapped in the manner described above (with common proportions mapped to the same white and black point values), the result will be FIG. 4B. That is, in FIG. 4A, RED, GREEN and BLUE densities are forced from density values 101, 103, and 105, respectively, back to the density value at position 90.

Thus, application of a lightness distribution mapping (which alone cannot effectively restore faded images) to a preliminary restoration produced from application of the reverse fading model (which alone produces a rough restoration) yields a reasonably good restoration.

Figure 5A:
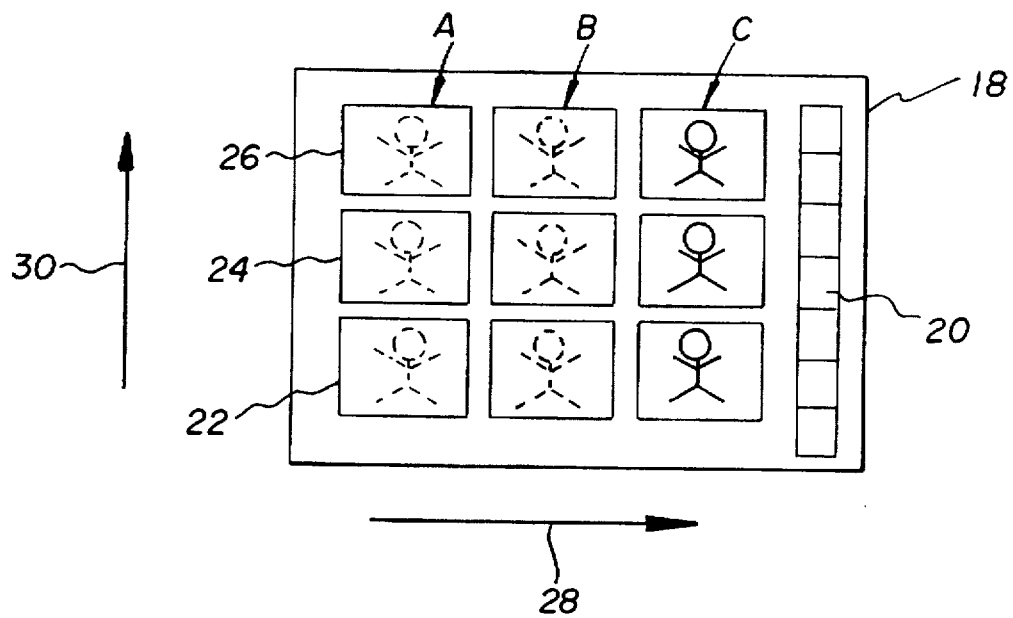
FIG. 5A is a magnified view of a typical screen on the monitor of the apparatus of FIG. 5.
Figure 5:
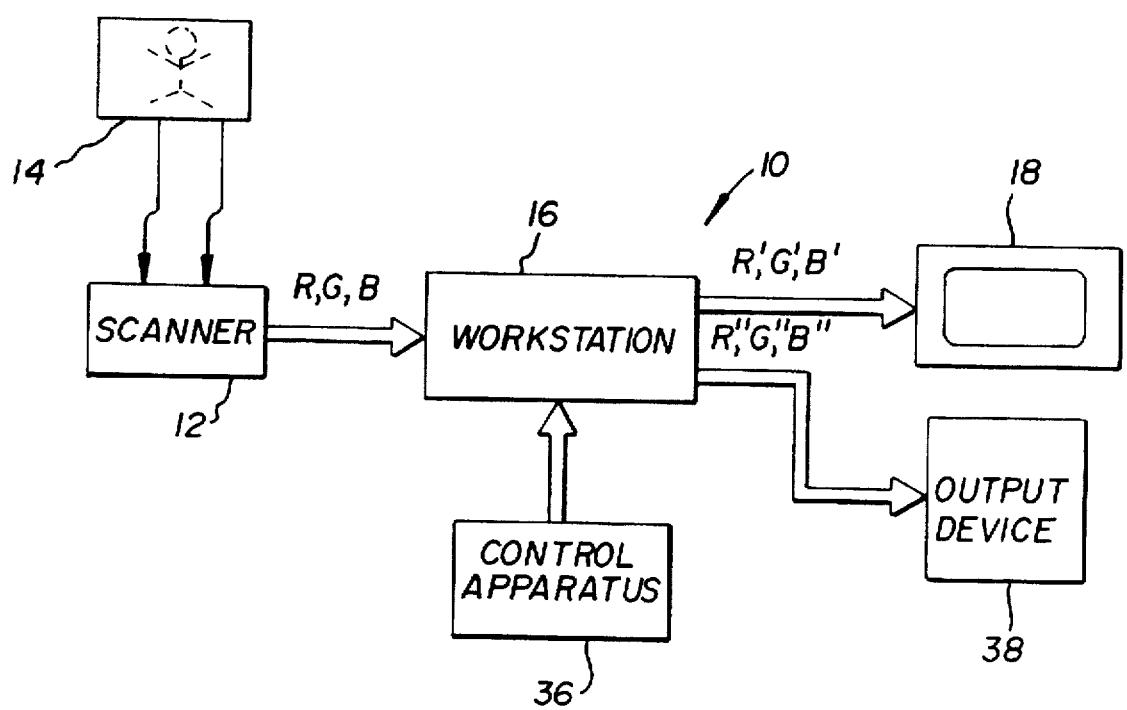
FIG. 5 is a block diagram of an apparatus of the present invention.

Referring now to FIG. 5, there is shown a block diagram of an apparatus that can be used to carry out the present invention. The apparatus 10 has a scanner 12 for scanning an original input image 14, which in FIG. 5 is in the form of a faded print. Scanner 12 obtains a digital image signal representation of input image 14 in scanner RGB space, which is input to a workstation 16. Workstation 16 may conveniently be an appropriately programmed digital computer or equivalent hardware circuitry. A control apparatus 36 allows for user input, and may typically be a keyboard and mouse combination. Workstation 16 converts the digital image signal from scanner 12 RGB space into a source independent space. Techniques for converting from a source dependent space to a source independent space are described, for example, in U.S. Pat. No. 4,979,032, U.S. Pat. No. 5,267,030, and U.S. Pat. No. 5,420,979. Workstation 16 also processes the image using the restoration model and lightness distribution mapping as described above and further below. Potential restorations are converted from a source independent space to a video R'G'B' color space by workstation 16, and are displayed on a monitor 18. When a user desires, a selected potential restoration can be sent to an output device 38 (which could, for example, be a color printer). Note that workstation 16 would convert the selected potential restoration from device independent space to output device R"G"B" color space code values.

A typical screenshot as might be seen on monitor 18, is depicted in FIG. 5A. There are shown a 3×3 matrix of low resolution potential restorations (although it will be appreciated that other matrices or arrangements could be used). Potential restorations in column A assume a shorter fade restoration time than column B, whereas those in column C assume a greater fade restoration time than column B. Fade restoration times are the same within a given column, and thus incrementally increase from column to column in the direction of arrow 28. Because of the matrix nature of the display, another image manipulation parameter can be displayed in different rows. In FIG. 5A it will be assumed that rows 22, 24, and 26 show different contrast factors (with contrast increasing incrementally in direction of arrow 30 from row to row), the contrast factor in a given row being constant. Thus, as described in further detail below, it is a simple matter for a user to not only restore an image, but enhance the restored image (note that the original image may not have been that pleasing to the eye, such that enhancement may be desirable). Control apparatus 36 allows a user, to point and select any of the potential restorations displayed on monitor 18 at any given time. Also, functions from a control bar 20 can be selected. Such functions include a selection of the increments in the fade time and contrast parameters, a Done button, a Revert button (which allows a user to return to the original scanned image) as well as a command to send a selected potential restoration to output device 38, and an auto-restoration which assumes a typical preselected fade time and applies the restoration model and lightness distribution mapping accordingly.

Figure 6B:
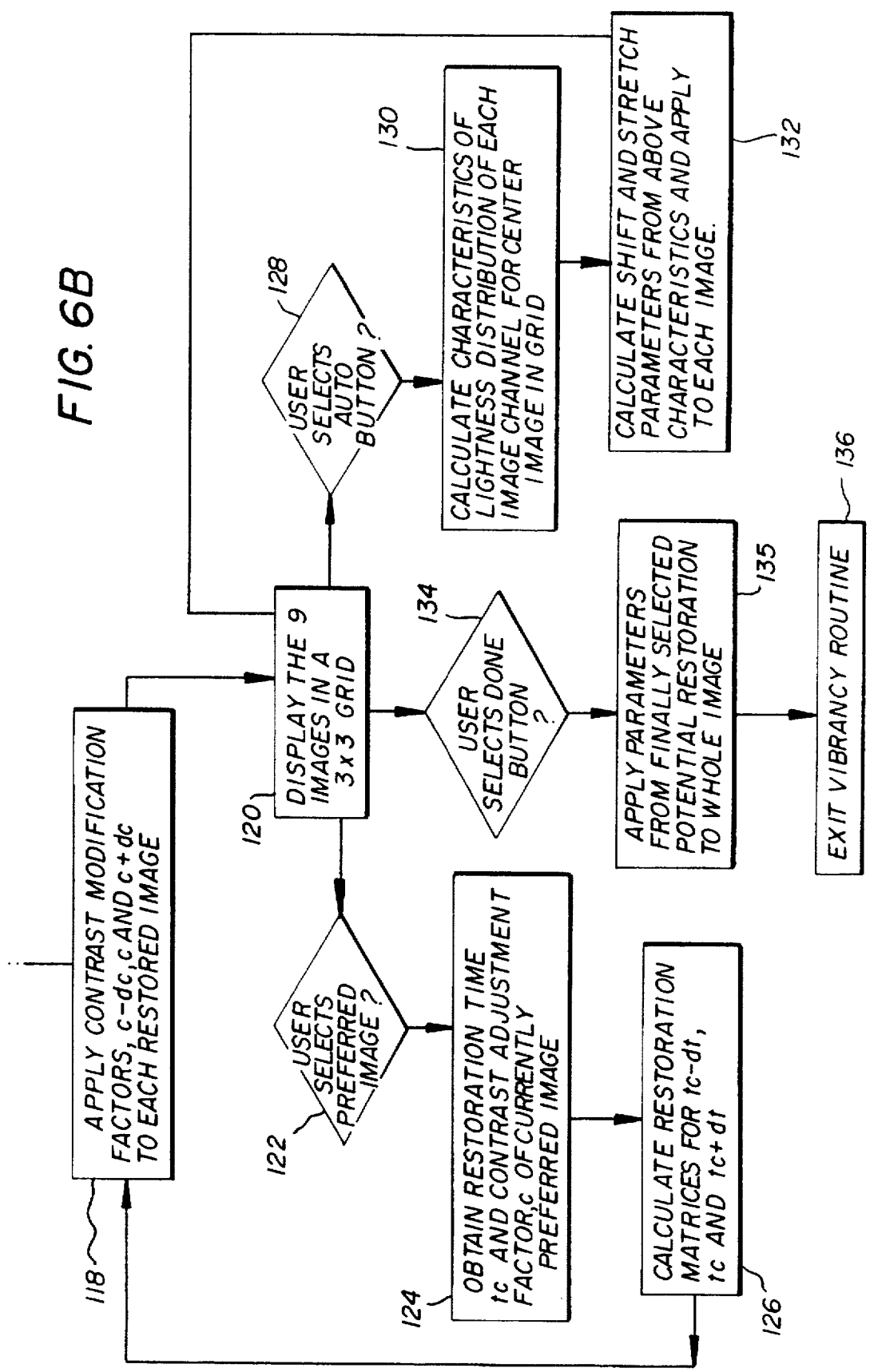
FIG. 6 is a flowchart illustrating a method of the present invention.

A method according to the present invention is shown in the flowchart of FIG. 6. Such a method can be executed on the apparatus of FIG. 5, the workstation 16 of which contains a suitable program (that is, a computer program code means) for performing the method. The program can be stored on any suitable computer readable storage medium. The computer readable storage medium can include, for example: magnetic storage media such as magnetic disc (such as a floppy disc) or magnetic tape; optical storage media such as optical disc, optical tape, or machine readable bar code; solid state electronic storage devices such as random access memory (RAM), or read only memory (ROM); or any other physical device or medium employed to store a computer program.

Referring to FIG. 6, the original image is scanned and digitized 106 to obtain a digital image signal in scanner RGB space. The digital image signal is then converted 107 to logE space, and is then subsampled 108 to provide lower resolution images for display purposes as will be described. An initial restoration time, $t_i$, and contrast adjustment factor, c, are retrieved 109 from the memory in workstation 16. Similarly, an initial time increment, dt, and contrast increment, dc, are retrieved 110 from memory. The initial values for $t_i$, c, dt, and dc, are pre-selected by the programmer, although they could of course be altered. Workstation 16 then calculates 111 restoration matrices using the initial values, for $t_i$, $t_i \pm dt$ and the general restoration matrix stored in the program, and applies them 116 to the sub-sampled image to produce three preliminary restorations. Contrast modification factors, c, c−dc, and c+dc are then applied 118 to the three preliminary restorations giving now a total of 9 preliminary restorations (representing three different restoration times at three different contrast levels). The 9 images are then displayed 120 in a 3×3 grid as shown in FIG. 5A and described above. At this point the user can use control apparatus 36 to select 122 a preferred preliminary restoration, or alternatively could select 128 an auto button or select 134 a Done button. Optionally, a user could select from among a number of additional restoration models sorted in the memory of workstation 16. These models would be optimized for different media or fading conditions. If the user selects 122 a preferred preliminary restoration, then the restoration time, $t_c$, and contrast adjustment factor, c, associated with that selected preliminary restoration is obtained 124. New restoration matrices are calculated 126 for $t_c$−dt (an additional time), $t_c$ and $t_c$+dt (another additional time), and applied 118 to the subsampled image along with the contrast factors.

If the user selects 128 the auto-button lightness distribution characteristics of each color channel in the currently preferred preliminary restoration are obtained 130 in the form of the maximum and minimum lightness values of each color channel. These values are input into the linear lightness distribution mapping function described above. The lightness distribution mapping function is now applied 132 to all nine images in the grid, and the newly calculated images displayed 120, with the selected image always be displayed in the center of the grid. At this point a user can again go through the loops commencing with step 122 or 128. When the user is satisfied with the restoration displayed in the center of the grid, he selects 134 the Done button. The restoration and lightness distribution mapping parameters, and contrast factor, of the center image are then applied 135 to the entire original digital image signal (in the device independent space). The resulting image can then be stored and/or sent to output device 38 or further manipulated using other image processing tools after exiting 136 from the routine.

After application of the histogram stretch and scale, an optional additional contrast boost or reduction may be applied by the user. This can be used to change the contrast of the image to the customer's reference.

The invention has been described with reference to a preferred embodiment. However, it will be appreciated that variations and modifications can be effected by a person of ordinary skill in the art without departing from the scope of the invention.

| PARTS LIST | |
| --- | --- |
| C, M, and Y | Layers |
| 2 | Element |
| 10 | Apparatus |
| 12 | Scanner |
| 14 | Input Image |
| 16 | Workstation |
| 18 | Monitor |
| 20 | Control Bar |
| 22, 24, and 26 | Rows |
| 28 | Arrow |
| 30 | Arrow |
| 36 | Control Apparatus |
| 38 | Output Device |
| 40a through 40g | Vertical Columns |
| 60 and 62 | Percentiles |
| 90 | Position |
| 100–136 | Steps |
| 100, 102 and 104 | Lines |
| 100a, 102a, and 104a | Broken Lines |
| 101, 103, and 105 | Density Values |
| 101, 103, and 105 | Intersections |
| 150 | Value |

We claim:

1. A method of restoring a color image comprised of one or more colorants and which image may have faded over time, which image is represented by an image signal, the method comprising:

(a) obtaining a restoration model which is a function of a variable time, which is the inverse of a model representing the fade rate of at least one of the colorants as a function of at least a variable time;

(b) selecting a time over which the image may have faded;

(c) applying the restoration model to the image signal to obtain a first preliminary restoration;

(d) selecting at least one further time over which the image may have faded;

13

(e) applying the restoration model to the image signal for each of the further times to obtain one or more further preliminary restorations;

(f) displaying the preliminary restorations;

(g) upon a user selecting one of the displayed restorations which corresponds to a currently selected time, $t_c$, in a first direction from another time, $t_i$, to which another of the displayed restorations corresponds, then applying the restoration model to the image signal using an additional time, $t_a$, to obtain an additional preliminary restoration, and displaying the additional preliminary restoration, wherein:

$$t_a > t_c \text{ if } t_c > t_i$$

or $$t_a < t_c \text{ if } t_c < t_i.$$

2. A method according to claim 1 wherein the additional time $t_a$ is a preselected increment from $t_c$, and wherein at least two additional preliminary restorations are obtained and simultaneously displayed with the user selected restoration, one having an additional time less than $t_c$ and the other having an additional time greater than $t_c$.

3. A method according to claim 1 wherein the image signal is a representation of the image in a source independent space.

4. A method of restoring a color image comprised of one or more colorants and which image may have faded over time, which image is represented by an image signal, the method comprising:

obtaining a restoration model which is a function of a variable time, which is the inverse of a model representing the fade rate of at least one of the colorants as a function of at least a variable time;

selecting a time over which the image may have faded;

applying the restoration model to the image signal to obtain a first preliminary restoration; and then determining characteristics of a lightness distribution of at least one color channel for the first preliminary restoration, and when the distribution characteristics do not meet preselected characteristics then modifying the first preliminary restoration so that the resulting first potential restoration meets the preselected characteristics.

5. A method according to claim 4 wherein the reselected characteristics are the proportions of the image having lightness values above and below upper and lower lightness values, and wherein the modifying step comprises mapping the upper and lower values to preselected white and black points, respectively and mapping values between the upper and lower lightness values to between the white and black points.

6. A method according to claim 4 wherein the restoration model is selected by a user from a plurality of possible restoration models.

7. A method of restoring a color image comprised of at least three colorants and which image may have faded over time, which image is represented by an image signal, the method comprising:

obtaining a restoration model which is a function of a variable time, which is the inverse of a model representing the fade rate of each of the colorants as a function of at least a variable time;

selecting a time over which the image may have faded;

applying the restoration model to the image signal to obtain a first preliminary restoration; and

14 then determining characteristics of a lightness distribution of each color channel for the first preliminary restoration, and for each color channel when preselected proportions of the image have lightness values above and below upper and lower lightness values which do not correspond to preselected white and black points, respectively, then mapping the upper and lower values to preselected white and black points, respectively, and mapping intermediate values between the white and black points, to obtain a first potential restoration;

wherein the intermediate values of each color channel are mapped using the same function.

8. A method according to claim 7 wherein the lightness value of all colors in each color channel are mapped using the same function.

9. A method of restoring a color image comprised of a plurality of colorants and which image may have faded over time, which image is represented by an image signal, the method comprising:

(a) obtaining a restoration model of each of the colorants which is a function of a variable time, which is the inverse of a model representing the fade rate of each one of the colorants in the image as a function of the amounts of the other colorants at the same location, and of a variable time;

(b) selecting a time over which the image may have faded;

(c) applying the restoration model to the image signal to obtain a first preliminary restoration; and (d) then determining characteristics of a lightness distribution of each color channel for the first preliminary restoration, and when preselected proportions of the image have lightness values above and below upper and lower lightness values which do not correspond to preselected white and black points, respectively, then mapping the upper and lower values to preselected white and black points, respectively, and mapping intermediate values with a function between the white and black points, to obtain a first potential restoration;

wherein the intermediate values of each color channel are mapped using the same increasing function.

10. A method according to claim 9 wherein the restoration model is applied to a representation of the image in a source independent space.

11. A method according to claim 9 wherein the function is a linear function.

12. A method according to claim 9 additionally comprising:

selecting at least one further time over which the image may have faded;

repeating steps (a) through (d) for each selected further time to obtain one or more further potential restorations;

displaying the potential restorations;

upon a user selecting one of the displayed restorations which corresponds to a currently selected time, $t_c$, in a first direction from another time, $t_i$, to which another of the displayed restorations corresponds, then applying the restoration model to the image signal using an additional time, $t_a$, to obtain an additional potential restoration, and displaying the additional potential restoration, wherein:

$$t_a > t_c \text{ if } t_c > t_i$$

or $$t_a < t_c \text{ if } t_c < t_i.$$

13. A method according to claim 9 wherein the image signal is a digital image signal, the method additionally comprising scanning the image to obtain the digital image signal.

14. A method according to claim 13 additionally comprising printing a potential restoration of the image.

15. An apparatus for restoring a color image comprised of one or more colorants and which image may have faded over time, which image is represented by an image signal, the apparatus comprising:

means for providing a restoration model which is a function of a variable time, which is the inverse of a model representing the fade rate of at least one of the colorants as a function of at least a variable time;

means for selecting a plurality of different times over which the image may have faded; and means for applying the restoration model to the image signal based on the different selected times to obtain respective preliminary restorations;

display means for simultaneously displaying the preliminary restorations;

user selection means for allowing a user to select one of a plurality of displayed restorations which user selected one corresponds to a currently selected time, $t_c$, in a first direction from another time, $t_i$, to which another of the displayed restorations corresponds; and means for then determining an additional time, $t_a$ such that:

$$t_a > t_c \text{ if } t_c > t_i,$$

or $$t_a < t_c \text{ if } t_c < t_i$$

wherein upon the user selection of a displayed restoration the means for applying then applies the restoration model to the image signal using $t_a$ to obtain an additional preliminary restoration; and wherein the display means then displays the additional preliminary restoration.

16. An apparatus according to claim 15 wherein the means for selecting a plurality of different times automatically selects at least three preselected times.

17. An apparatus according to claim 15 wherein the restoration model is applied to a representation of the image in a source independent space.

18. An apparatus for restoring a color image comprised of a plurality of colorants and which image may have faded over time, which image is represented by an image signal, the apparatus comprising:

(a) means for obtaining a restoration model of each of the colorants which is a function of a variable time, which is the inverse of a model representing the fade rate of each one of the colorants in the image as a function of the amounts of the other colorants at the same location, and of a variable time;

(b) means for selecting a time over which the image may have faded;

(c) means for applying the restoration model to the image signal to obtain a first preliminary restoration; and (d) means for then determining characteristics of a lightness distribution of each color channel for the first preliminary restoration;

(e) mapping means which, when preselected proportions of the image have lightness values above and below upper and lower lightness values which do not correspond to preselected white and black points, respectively, then maps the upper and lower values to preselected white and black points, respectively, and maps intermediate values between the white and black points;

wherein mapping means maps the intermediate values of each color channel using the same function.

19. An apparatus according to claim 18 wherein the image signal is a representation of the image in a source independent space.

20. An apparatus according to claim 18 wherein:

the means for selecting selects a plurality of times over which the image may have faded;

the means for applying applies the restoration model to the image signal based on the different selected times to obtain respective preliminary restorations;

the apparatus additionally comprising:

(f) a display means for simultaneously displaying the preliminary restorations;

(g) a user selection means for allowing a user to select one of a plurality of displayed restorations which user selected one corresponds to a currently selected time, $t_c$, in a first direction from another time, $t_i$, to which another of the displayed restorations corresponds; and (h) means for then determining an additional time, $t_a$ such that:

$$t_a > t_c \text{ if } t_c > t_i,$$

or $$t_a < t_c \text{ if } t_c < t_i$$

and wherein:

upon a user selecting a displayed restoration the means for applying applies the restoration model to the image signal using ta to obtain an additional preliminary restoration; and the display means then displays the additional preliminary restoration.

21. An apparatus according to claim 20 wherein the image signal is a digital image signal, the apparatus additionally comprising a scanner which can scan the image to obtain the digital image signal.

22. An apparatus according to claim 21 additionally comprising a printer to print a selected restoration.

23. A computer program product for restoring a color image comprised of a plurality of colorants and which image may have faded over time, comprising: a computer readable storage medium including computer readable program code means comprising:

(a) means for obtaining an image signal representing the image;

(b) means for obtaining a restoration model of each of the colorants which is a function of a variable time, which is the inverse of a model representing the fade rate of each one of the colorants in the image as a function of the amounts of the other colorants at the same location, and of a variable time;

(c) means for selecting a time over which the image may have faded;

(d) means for applying the restoration model to the image signal to obtain a first preliminary restoration; and (e) means for then determining characteristics of a lightness distribution of each color channel for the first preliminary restoration;

(f) mapping means which, when preselected proportions of the image have lightness values above and below upper and lower lightness values which do not correspond to preselected white and black points, respectively, then maps the upper and lower values to preselected white and black points, respectively, and maps intermediate values between the white and black points, to obtain a first potential restoration;

wherein the mapping means maps the intermediate values of each color channel using the same function.

24. A computer program product for restoring a color image comprised of a plurality of colorants and which image may have faded over time, comprising: a computer readable storage medium including computer readable program code means comprising:

(a) means for obtaining an image signal representing the image;

(b) means for obtaining a restoration model which is a function of a variable time, which is the inverse of a model representing the fade rate of at least one of the colorants as a function of at least a variable time;

(c) means for selecting a plurality of different times over which the image may have faded;

(d) means for applying the restoration model to the image signal based on the different selected times to obtain respective preliminary restorations;

(e) display means for causing a display to simultaneously display the preliminary restorations;

(f) selection means for receiving a user's selection of one of a plurality of displayed restorations which user selected one corresponds to a currently selected time, $t_c$, in a first direction from another time, $t_i$, to which another of the displayed restorations corresponds; and (g) means for then determining an additional time, $t_a$ such that:

$$t_a > t_c \text{ if } t_c > t_i,$$

or $$t_a < t_c \text{ if } t_c < t_i;$$

wherein:

following user selection of a displayed restoration the means for applying then applies the restoration model to the image signal using $t_a$ to obtain an additional preliminary restoration; and wherein the display means then causes the display to display the additional preliminary restoration.

25. A computer program product according to claim 24 wherein the display means causes the display to simultaneously display the additional preliminary restoration and the user selected potential restoration.

* * * * *